US012663601B2

(12) United States Patent     (10) Patent No.:   US 12,663,601 B2
Langman et al.            (45) Date of Patent:     Jun. 23, 2026

(54) MODULE SYSTEM FOR SLACK CABLE STORAGE

(71) Applicant: PPC BROADBAND, INC., East Syracuse, NY (US)

(72) Inventors: Michael Langman, East Syracuse, NY (US); Peter Carapella, Fayetteville, NY (US); Gerald Joseph Meier, Olathe, KS (US)

(73) Assignee: PPC BROADBAND, INC., East Syracuse, NY (US)

( * ) Notice: Subject to any disclaimer, the term of this patent is extended or adjusted under 35 U.S.C. 154(b) by 579 days.

(21) Appl. No.: 18/091,780

(22) Filed: Dec. 30, 2022

(65) Prior Publication Data

US 2023/0213719 A1     Jul. 6, 2023

Related U.S. Application Data

(60) Provisional application No. 63/295,802, filed on Dec. 31, 2021.

(51) Int. Cl.
*G02B 6/44*        (2006.01)

(52) U.S. Cl.
CPC .................................. *G02B 6/4452* (2013.01)

(58) Field of Classification Search
CPC ........................................................ G02B 6/44
USPC ........................................................ 385/135
See application file for complete search history.

(56) References Cited

U.S. PATENT DOCUMENTS

| | | | |
|---|---|---|---|
| 5,509,100 A | 4/1996 | Garnett et al. | |
| 6,381,393 B1 | 4/2002 | Matthews et al. | |

| | | | |
|---|---|---|---|
| 6,567,601 B2 | 5/2003 | Daoud et al. | |
| 9,057,859 B2 * | 6/2015 | Solheid .............. | G02B 6/44528 |
| 9,195,021 B2 * | 11/2015 | Solheid .............. | G02B 6/44528 |
| 9,791,653 B2 * | 10/2017 | Aznag .................. | G02B 6/4442 |
| 10,082,636 B2 * | 9/2018 | Solheid .................... | H04Q 1/06 |

(Continued)

FOREIGN PATENT DOCUMENTS

| | | | | |
|---|---|---|---|---|
| CN | 102165351 A | * | 8/2011 | ............. G02B 6/445 |
| JP | H11500237 A | * | 1/1999 | ........... G02B 6/4454 |

(Continued)

OTHER PUBLICATIONS

International Search Report and Written Opinion dated May 3, 2023 in corresponding International Application No. PCT/US2022/054353, 15 pages.

*Primary Examiner* — Kaveh C Kianni

(74) *Attorney, Agent, or Firm* — MH2 TECHNOLOGY LAW GROUP LLP

(57)          ABSTRACT

A cable storage container may include a base portion having a cavity and a base opening portion, a cover portion that may be configured to be attached to the base portion so as to cover the base opening portion, and a module portion that may be configured to be removed from and replaced in the base portion. The module portion may include a plurality of cable bundle receptacles that each may be configured to receive a portion of a cable bundle, and each two adjacent ones of the cable bundle receptacles may be separated by a separating wall portion, and the module portion may be configured to support the cable bundle in one of the cable bundle receptacles so as to restrict the cable bundle from expanding and interfering with contents of the base portion.

14 Claims, 7 Drawing Sheets

(56)  References Cited

U.S. PATENT DOCUMENTS

| | | | | |
|---|---|---|---|---|
| 10,473,873 B2 * | 11/2019 | Diepstraten | ........ | G02B 6/44528 |
| 10,955,621 B2 * | 3/2021 | Prevratil | .............. | G02B 6/3628 |
| 10,976,512 B2 * | 4/2021 | Carapella | ............ | G02B 6/4471 |
| 11,385,429 B2 * | 7/2022 | Bolster | ................ | G02B 6/3874 |
| 11,635,578 B2 * | 4/2023 | Claes | ................... | G02B 6/4455 |
| | | | | 385/135 |
| 2005/0213921 A1 * | 9/2005 | Mertesdorf | .......... | G02B 6/4442 |
| | | | | 385/135 |
| 2006/0193587 A1 * | 8/2006 | Wittmeier | ............ | G02B 6/4445 |
| | | | | 385/135 |
| 2007/0047894 A1 * | 3/2007 | Holmberg | .......... | G02B 6/44526 |
| | | | | 385/134 |
| 2009/0202212 A1 | 8/2009 | Cox et al. | | |
| 2009/0245743 A1 * | 10/2009 | Cote | ................. | G02B 6/44526 |
| | | | | 385/135 |
| 2013/0074311 A1 * | 3/2013 | Vastmans | ........... | G02B 6/44785 |
| | | | | 29/450 |

FOREIGN PATENT DOCUMENTS

| | | | | | |
|---|---|---|---|---|---|
| WO | 2004021062 A1 | | 3/2004 | | |
| WO | WO-2007027727 A2 * | | 3/2007 | ........ | G02B 6/45526 |
| WO | WO-2009120280 A2 * | | 10/2009 | ........ | G02B 6/45526 |
| WO | 2013087471 A1 | | 6/2013 | | |

* cited by examiner

MODULE SYSTEM FOR SLACK CABLE STORAGE

CROSS-REFERENCE TO RELATED APPLICATION

This application claims the benefit of U.S. Provisional Application No. 63/295,802, which was filed on Dec. 31, 2021, the disclosure of which is hereby incorporated by reference herein in its entirety.

BACKGROUND

The present disclosure relates to slack cable storage in an enclosure in which multiple cable bundles can be stored. More particularly, the present invention relates to modules that separately contain cable bundles in a slack cable storage enclosure.

The telecommunications industry has recognized the many advantages of fiber optic cable, including a significantly higher bandwidth and greater performance and reliability than conventional copper wire systems. Despite the many advantages, extremely high installation costs have discouraged service providers from deploying continuous fiber optic networks extending from their central office facilities all the way to subscriber premises. As used herein, "fiber-to-the-premises" (FTTP) refers to the deployment of an optical fiber network that extends continuously to the subscriber premises. Along the primary distribution lines of a communications network, the volume of traffic and the number of customers often justify the high installation cost of optical fiber. However, thus far, the additional cost of deploying optical fiber to remote, individual subscriber premises has far outweighed the potential benefits to service providers.

Therefore, instead of implementing FTTP networks, service providers have developed various strategies to provide certain of the benefits of fiber optic networks, without actually incurring the costs associated with deploying optical fiber all the way to the home (or other subscriber premises). One such strategy is known as "fiber-to-the-curb" (FTTC), in which optical fiber extends from the service provider's central office to local terminals (also referred to as outside plant terminals, local convergence cabinets, etc.) that are situated in service areas having a high concentration of subscribers. Such FTTC systems provide certain of the benefits of an all fiber optic network, but still require the deployment of a continuous fiber optic network from the service provider's transceiving and/or switching equipment to the subscriber's transceiving equipment in order to realize the full benefit of the fiber optic network.

It is known that fiber optic cables (such as, for example, drop cables) may be efficiently connectorized in a controlled manufacturing environment, such as an optical cable assembly plant, thereby avoiding the higher material, labor and equipment costs required to connectorize cables in the field. By pre-connectorizing the fiber optic cable, the necessity of field splicing an optical fiber of the cable to, for example, an optical fiber of a distribution cable, is avoided. However, the pre-connectorized cable must be manufactured in either custom or preselected standard lengths, the former being impractical due to the higher manufacturing costs, so the latter is a preferred solution in most instances. Storing an excess length of cable that can result when deploying, for example, a standard 175-foot cable when the length of the cable actually needed is only 110 feet, can present a problem. Service providers have long desired to deploy pre-connectorized cables in order to reduce field labor and installation costs, but thus far have not been presented with an effective manner in which to store the excess length of the cable (also referred to herein as cable slack).

Therefore, it may be desirable to provide an apparatus for storing the fiber optic cable slack that results when deploying a standard length pre-connectorized cable to a subscriber premises. Further, it may be desirable to provide an apparatus that both stores multiple bundles of cable slack and substantially conceals it from view, such as a slack storage receptacle that is mounted to a wall surface of a subscriber premises, is buried in the ground, or is mounted in close proximity to a connection terminal, such as an aerial closure or an above-ground telecommunications pedestal.

It may be desirable to provide a system that support slack cable bundles so as to restrict the slack cable bundles from expanding and interfering with contents of a container in which the cable is stored.

SUMMARY

In accordance with various embodiments of the disclosure, a system contains a module that is configured to support slack cable bundles in cable bundle receptacles so as to restrict the slack cable bundles from expanding and interfering with each other and/or other contents of an enclosure.

Embodiments of the disclosure include a slack cable storage system including: a base having a plurality of walls that are configured to form a cavity having an open front; a cover configured to be attached to the base and configured to close the open front of the base; and a module configured to be removed from and replaced in the base. The module is configured to support a cable bundle in a first cable bundle slot so as to restrict the cable bundle from expanding and interfering with contents of the base.

In embodiments, the base is configured to receive the module.

In embodiments, the module is configured to include a plurality of cable bundle slots.

In embodiments, each of the cable bundle slots is configured to receive a portion of a cable bundle.

In embodiments, the cable bundle slots are arranged in a row.

In embodiments, each two adjacent ones of the cable bundle slots are separated by a separating wall.

In embodiments, the separating wall is configured to extend from side walls of the module.

In embodiments, a first cable bundle slot of the cable bundle slots is configured to have an upper slit in an upper wall of the first cable bundle slot.

In embodiments, the first cable bundle slot is configured to have a lower slit in a lower wall of the first cable bundle slot.

In embodiments, the upper slit is configured to grip a first portion of the cable of the cable bundle in the first cable bundle slot.

In embodiments, the lower slit is configured to grip a second portion of the cable of the cable bundle in the first cable bundle slot.

In embodiments, the module includes a removable strap that is configured to provide a barrier on one face of the module to prevent the cable bundle from exiting the first cable bundle slot.

In embodiments, each of the cable bundle slots is configured to receive two of the cable bundles.

In embodiments, the separating wall is configured to extend from a plane that includes rear edges of the side walls at an angle less than 90 degrees relative to the plane.

Embodiments of the disclosure include a slack cable storage system including: a base portion having a plurality of wall portions that are configured to form a cavity having an open front; a cover portion configured to be attached to the base portion and configured to close the open front of the base portion; and a module portion configured to be removed from and replaced in the base portion. The module portion is configured to support the cable bundle in one of the cable bundle receptacles so as to restrict the cable bundle from expanding and interfering with contents of the base portion.

In embodiments, the module portion is configured to include a plurality of cable bundle receptacles.

In embodiments, each of the cable bundle receptacles is configured to receive a portion of a cable bundle.

In embodiments, the cable bundle receptacles are arranged in a row.

In embodiments, each two adjacent ones of the cable bundle receptacles are separated by a separating wall portion.

In embodiments, the module portion includes a removable retention portion that is configured to provide a barrier on one face of the module portion to restrict the cable bundle from exiting the cable bundle receptacles.

In embodiments, the base portion is configured to receive a plurality of the module portion.

In embodiments, the module portion is replaceably removable from the base portion.

In embodiments, a first cable bundle receptacle of the cable bundle receptacles is configured to have an upper cable retention portion in an upper wall portion of the first cable bundle receptacle.

In embodiments, the first cable bundle receptacle is configured to have a lower cable retention portion in a lower wall portion of the first cable bundle receptacle.

In embodiments, the upper cable retention portion is configured to grip a first portion of a cable of a cable bundle in the first cable bundle receptacle.

In embodiments, the lower cable retention portion is configured to grip a second portion of the cable of the cable bundle in the first cable bundle receptacle.

In embodiments, the upper cable retention portion is a slit in the upper wall portion.

In embodiments, the lower cable retention portion is a slit in the lower wall portion.

In embodiments, the cable bundle receptacle is a cable bundle slot.

In embodiments, the cable bundle receptacle is a rectangular parallelepiped shape.

In embodiments, the separating wall portion is configured to extend from a plane that includes rear edges of side walls of the module portion at an angle less than 90 degrees relative to the plane.

Embodiments of the disclosure include a cable storage container including: a base portion having a cavity and a base opening portion; a cover portion configured to be attached to the base portion so as to cover the base opening portion; and a module portion configured to be removed from and replaced in the base portion. The module portion is configured to support a cable bundle in one of the cable bundle receptacles so as to restrict the cable bundle from expanding and interfering with contents of the base portion.

In embodiments, the module portion has a plurality of cable bundle receptacles.

In embodiments, each of the cable bundle receptacles is configured to receive a portion of a cable bundle.

In embodiments, each two adjacent ones of the cable bundle receptacles are separated by a separating wall portion.

In embodiments, the cable bundle receptacles are arranged in a row.

In embodiments, the module portion includes a removable retention portion that is configured to provide a barrier on one face of the module portion to restrict the cable bundle from exiting the cable bundle receptacles.

In embodiments, the base portion is configured to receive a plurality of the module portion.

In embodiments, the cable bundle receptacle is a rectangular parallelepiped shape.

In embodiments, the separating wall portion is configured to extend from a plane that includes rear edges of side walls of the module portion at an angle less than 90 degrees relative to the plane.

In embodiments, the module portion has a back wall portion.

In embodiments, the separating wall portion is configured to extend from the back wall portion of the module portion at an angle less than 90 degrees relative to the back wall portion of the module portion.

Various aspects of the slack storage system, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

In accordance with various embodiments of the disclosure, an enclosure contains a module that is configured to support slack cable bundles in cable bundle receptacles so as to restrict the slack cable bundles from expanding and interfering with each other and/or other contents of the enclosure.

It is to be understood that this present disclosure is not limited to the specific embodiments and methods described below, as specific components and/or conditions may vary. Furthermore, the terminology used herein is used only for the purpose of describing particular embodiments of the present disclosure and is not intended to be limiting in any way.

Figure 7:
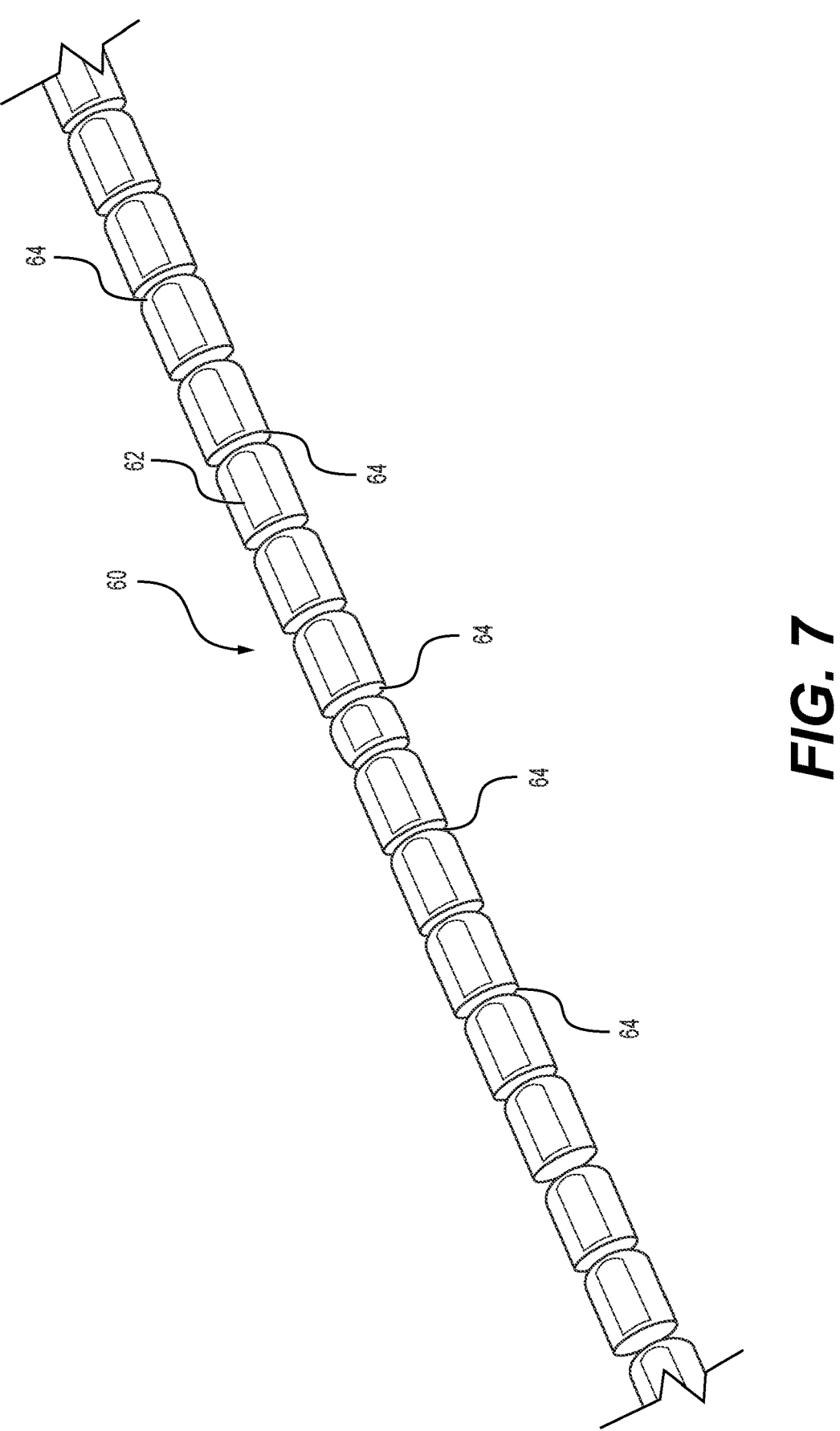
FIG. 7 illustrates a partial isometric view of an example semi-rigid cable such as the mini-flex cable.

Semi-rigid cables such as, for example, the cable 60 shown in FIG. 7, tend to unwind when bundled in a loop. As shown in FIG. 7, the cable 60 has a semi-rigid outer surface 62 with spaced annular ridges 64. This construction tends to urge the cable 60 to unwind when bundled. Therefore, in circumstances where bundles of semi-rigid cables must be stored, there is a need to compactly store the bundled cables such that the bundled cables do not unwind and possibly interfere with each other.

Figure 1:
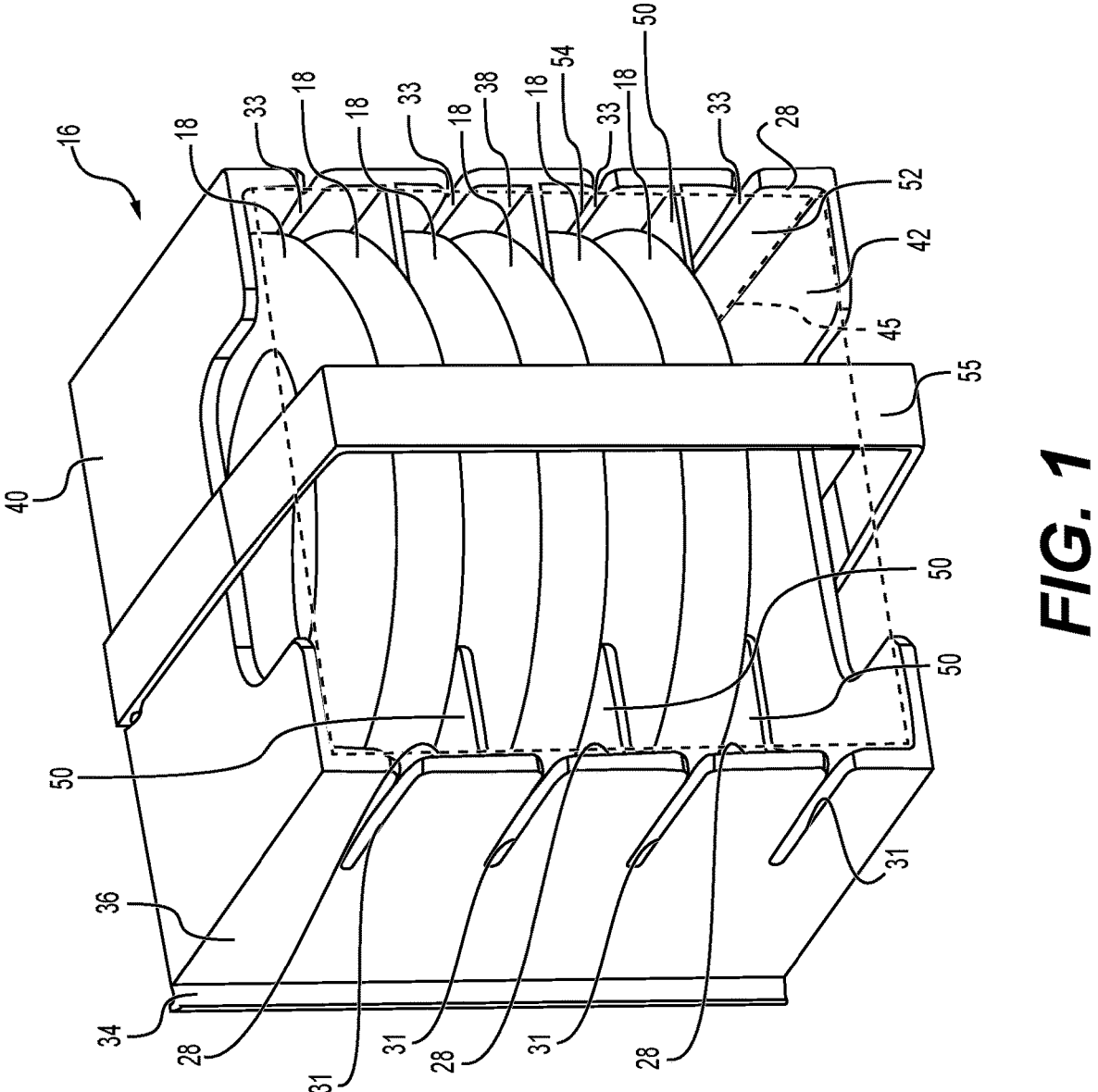
FIG. 1 is a perspective view of an exemplary module in accordance with various aspects of the disclosure.

FIG. 1 shows an exemplary slack cable organizing module 16 having a plurality of spaced cable bundle slots 28. In the example shown in FIG. 1, the module 16 has four spaced cable bundle slots 28 extending between a first lateral wall 40 and a second lateral wall 42. It is understood that even though the module 16 shown in FIG. 1 has four slots 28, other examples have fewer or more slots 28. In this example, each slot 28 can hold between one and four cable bundles 18, depending on the length of cable in each cable bundle 18. In this example, each slot 28 has a first slit 31 in a first side wall 36, and a second slit 33 in a second side wall 38. Each slit 31, 33 can have a progressively narrowing width so that a cable end (which could have a varying diameter) can be wedged and secured within the slit 31, 33. The progressive narrowing allows the slit 31, 33 to accommodate cables of different diameters. A shown in FIG. 4, each first slit 31 is configured to receive a first cable end 37 from a bundle 18, and each second slit 33 is configured to receive a second cable end 39 from the same bundle 18.

Figure 2:
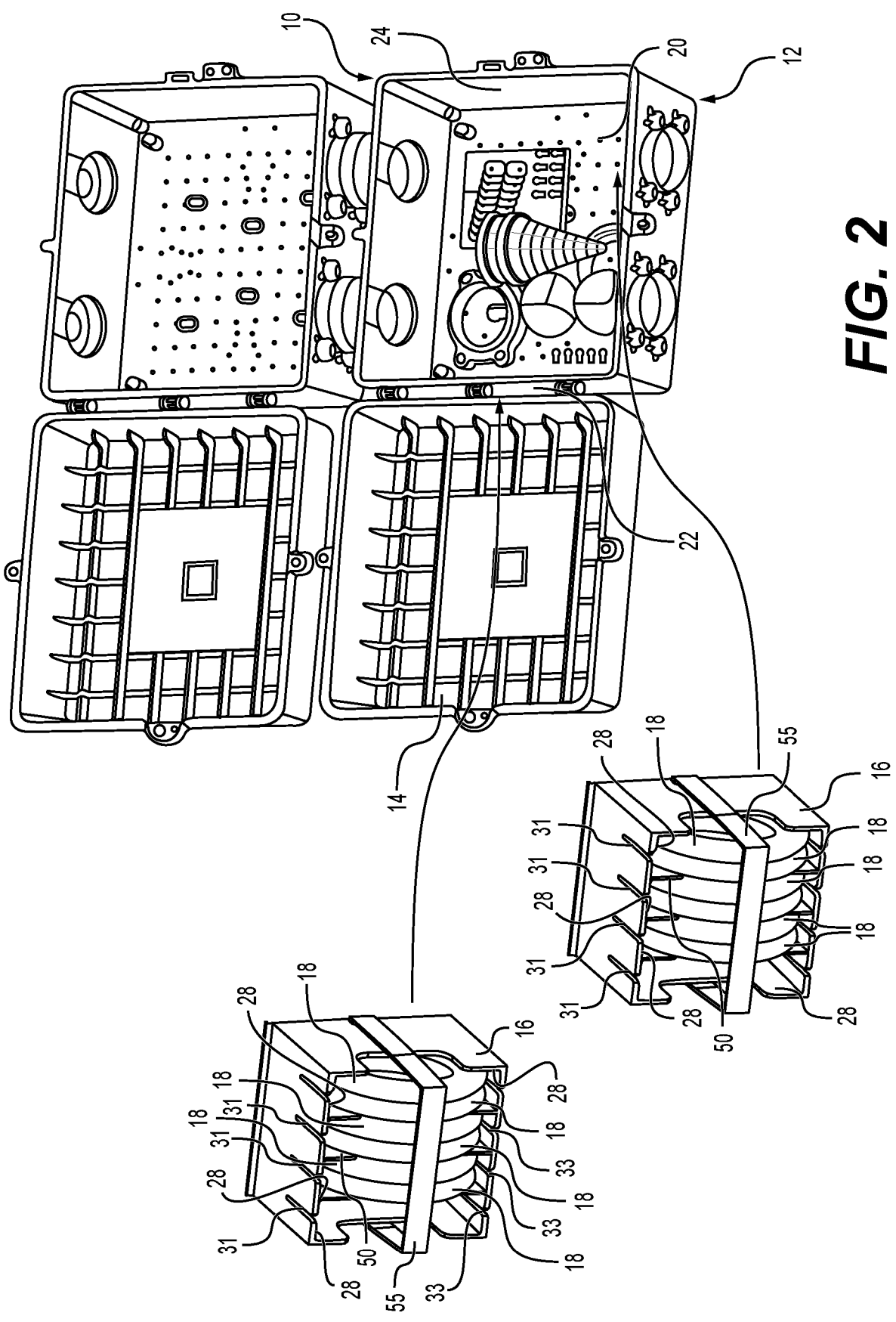
FIG. 2 is an expanded perspective view of a slack cable storage enclosure and two modules of FIG. 1.
Figure 3:
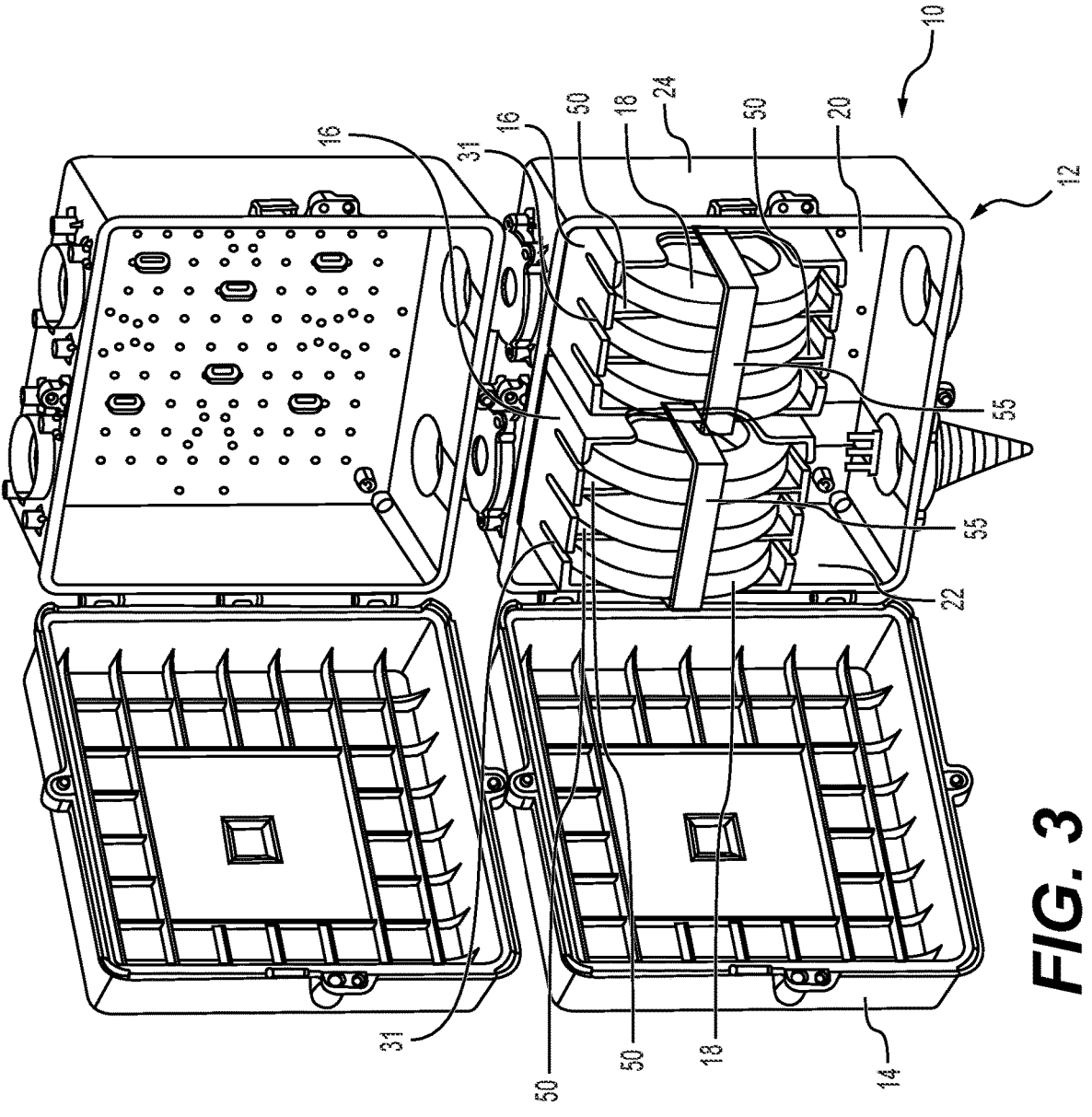
FIG. 3 is a perspective view of the assembled slack cable storage enclosure and two modules of FIG. 2.
Figure 4:
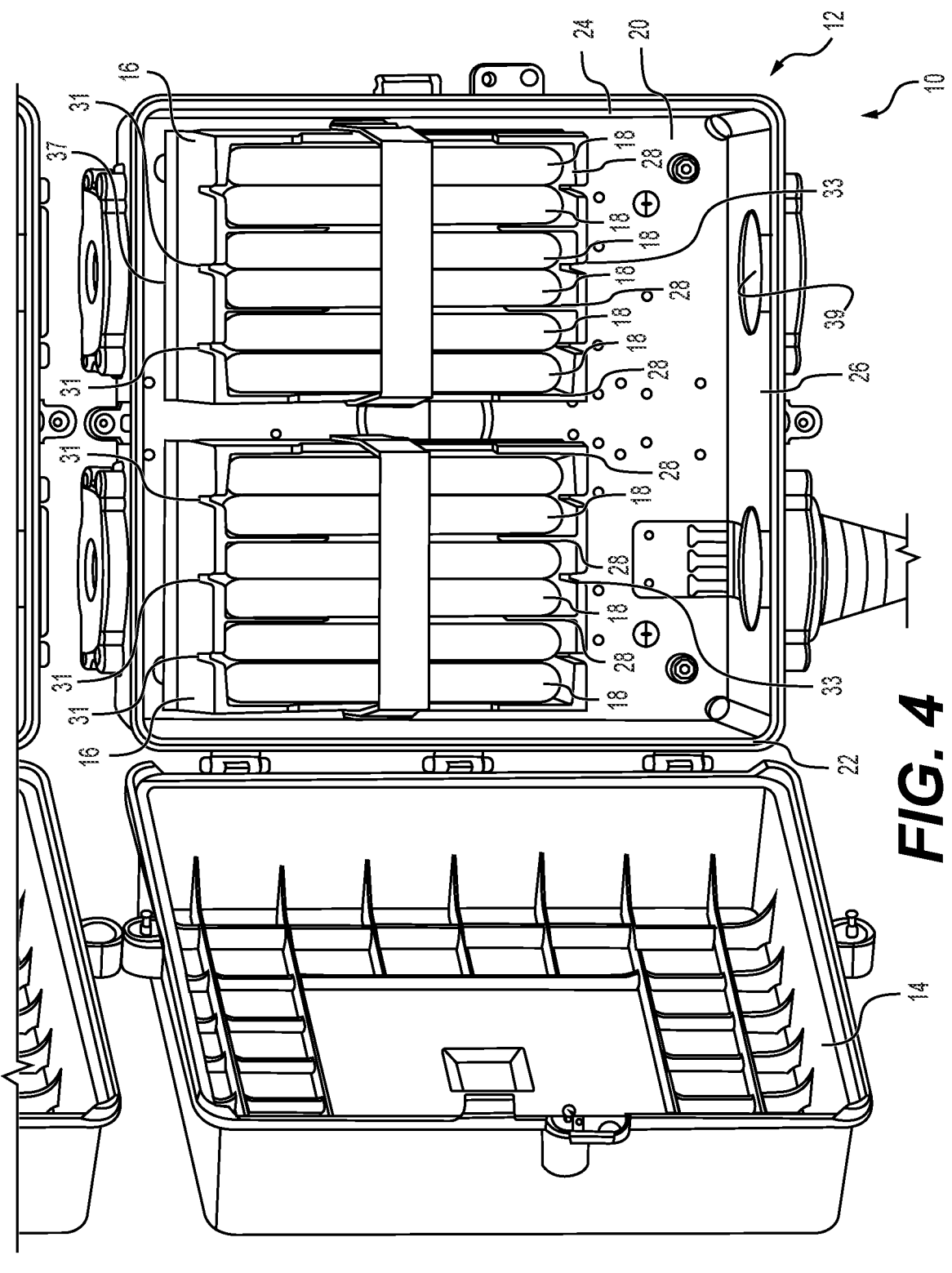
FIG. 4 is a front view of the assembled slack cable storage enclosure and two modules of FIG. 2.

FIGS. 2-4 show an exemplary slack cable storage enclosure 10 that includes a base 12, a cover 14, two of the modules 16, and at least one slack cable storage bundle 18. The base 12 includes a back wall 20, a first side wall 22, a second side wall 24, a bottom wall 26, and a top wall that form a cavity having a front opening. The cover 14 is configured to close off the front opening defined by the base 12. In this example, each module 16 has four laterally spaced cable bundle slots 28 extending between the first lateral wall 40 and the second lateral wall 42 of the module.

Each cable bundle slot 28 is configured to receive one or more of the cable bundles 18 to store the excess length of cable that makes up each cable bundle 32. Each cable bundle slot 28 is configured to receive at least one cable bundle 18. In the example shown in FIGS. 1 and 2, two cable bundles 18 are stored in each cable bundle slot 28. If particular cable bundles 18 include only a small length of cable and/or cable of small diameter, more than two cable bundles 18 can fit in each cable bundle slot 28. In this example, each module 16 has a rear wall 34, four outer walls (the first side wall 36, the second side wall 38, the first lateral wall 40, and the second lateral wall 42) affixed to the rear wall 34, which define a recess 45 (shown as dashed element 45 in FIG. 1). In other embodiments, the module 16 does not have the rear wall 34 such that the module 16 is open at the rear. Recess 45 is divided, in this example, by three internal separating walls 50 to define the cable bundle slots 28. As shown in FIG. 1, each internal separating wall 50 can be disposed between the two opposing side walls 36, 38 to define the four cable bundle slots 28 in each module 16 in FIGS. 1 and 2, and three cable bundle slots 28 in FIGS. 3 and 4). As shown in FIG. 1, each internal separating wall 50 separates an inside surface of each of the side walls 36, 38 into walls 52, 54 of cable bundle slot 28. As shown in FIGS. 1-3, in embodiments, a strap 55 (such as, for example, a hook and loop fastener strap) is affixed to each internal module 16. The strap 55 is configured to secure the cable bundles 18 in their respective cable bundle slots 28.

As shown in examples of FIGS. 2-4, the base 12 can be configured to receive two modules 16 mounted to the back wall 20 of the base 12. In embodiments, the enclosure 12 can house any number of modules 16. FIG. 2 illustrates an expanded assembly view of the slack cable storage enclosure 10 and two modules 16 with cable bundles 18 configured to be mounted in the slack cable storage enclosure 10. FIGS. 3 and 4 show the assembled slack cable storage enclosure 10 and two modules 16 with cable bundles 18.

Figure 5:
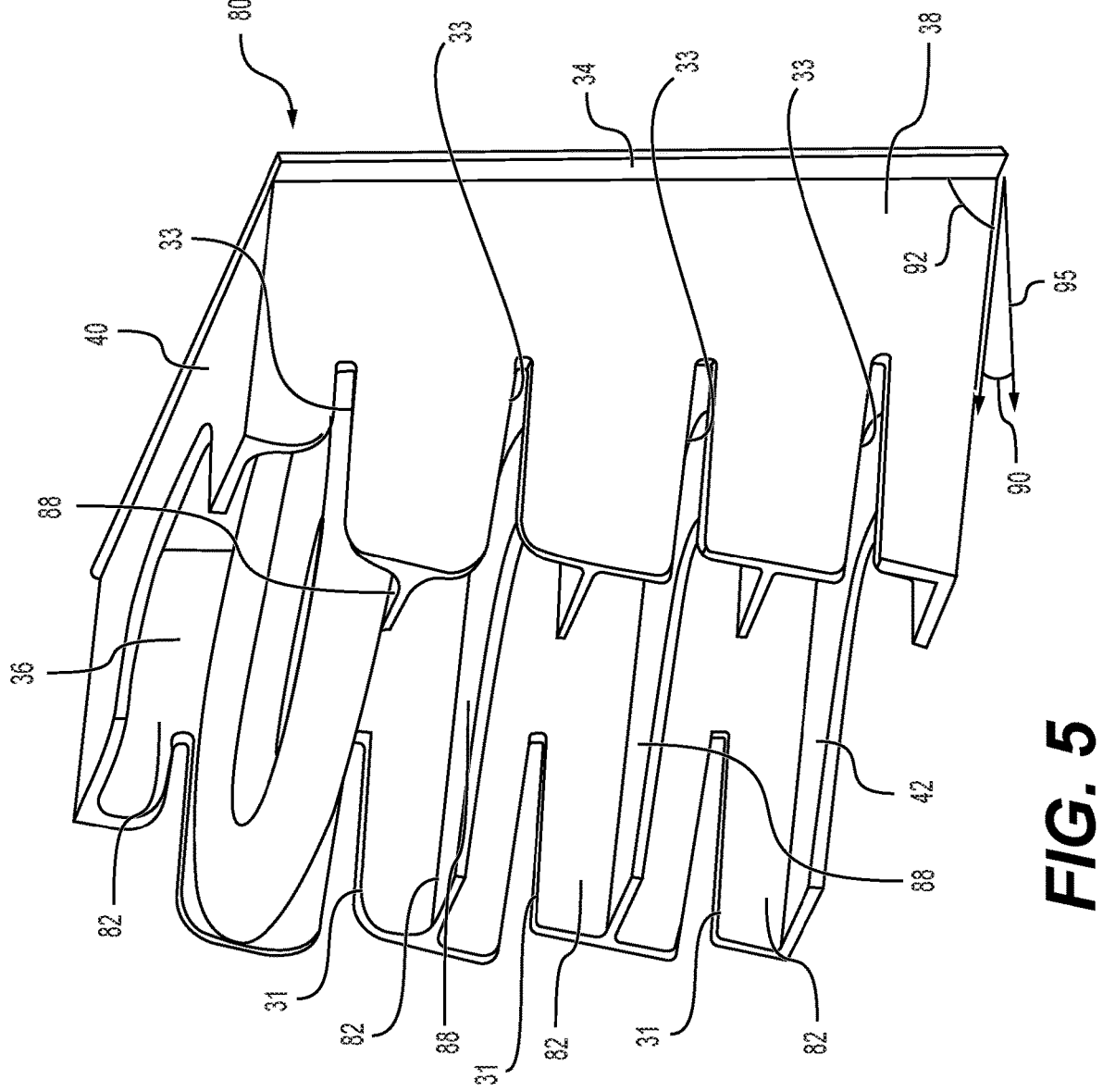
FIG. 5 is a perspective view of an exemplary module in accordance with various aspects of the disclosure.

FIG. 5 shows an alternative exemplary module 80 which is similar to module 16 except that module 80 includes angled cable bundle slots 82. The angled slots 82 can be configured to hold one or more of the cable bundles 18 depending on the length of cable in each cable bundle 18. An upper wall 40, a lower wall 42, and internal separating walls 88 are disposed at a non-perpendicular angle 92 relative to the rear wall 34. The lower wall 42 is also disposed at a non-right angle 90 relative to a line 95 perpendicular to the rear wall 34.

Figure 6:
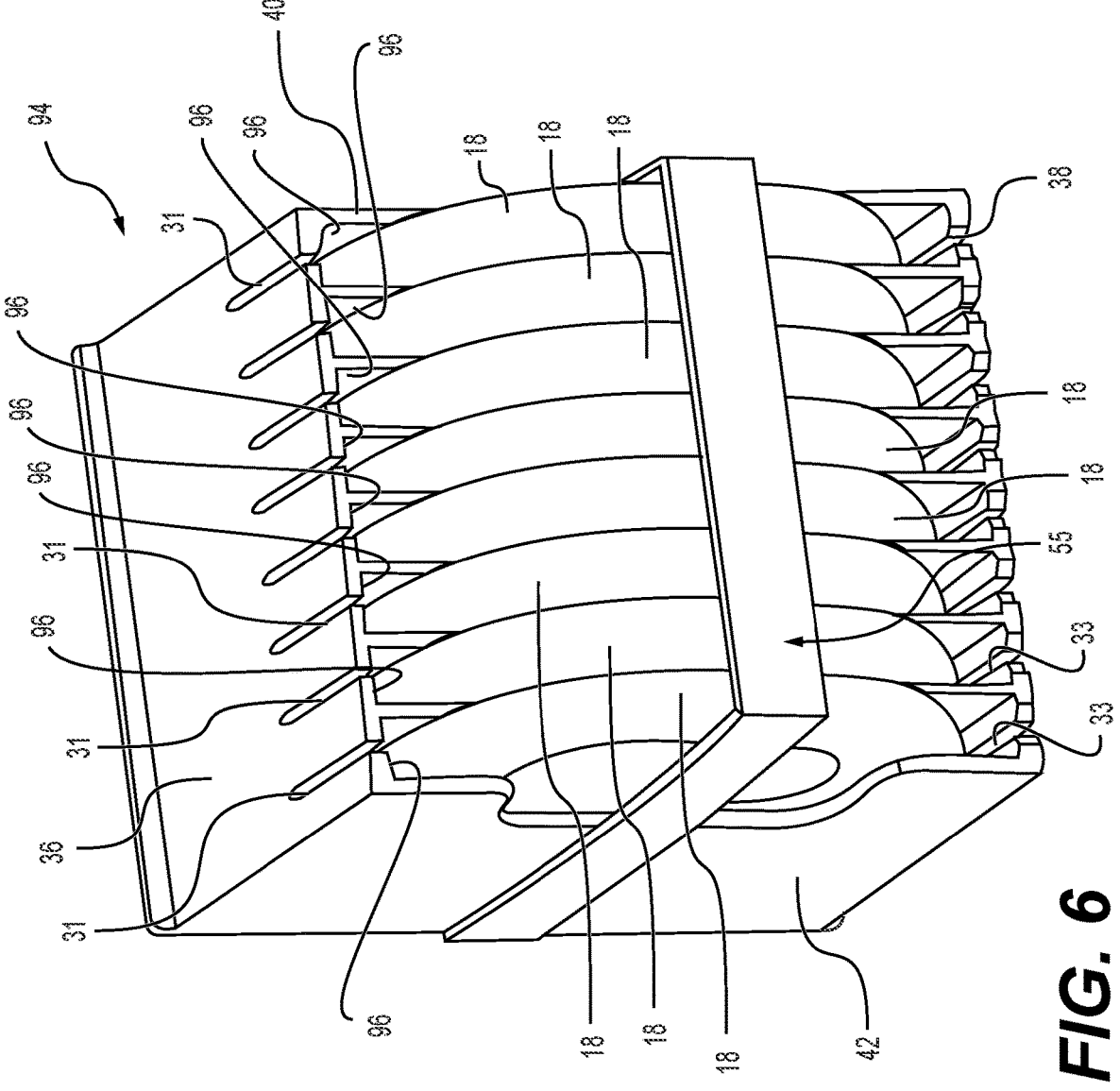
FIG. 6 is a perspective view of an exemplary module in accordance with various aspects of the disclosure.

FIG. 6 shows an alternative exemplary module 94 having the rear wall 34, the walls 36, 38, 40, 42, and slits 31, 33 similar to the example shown in FIG. 1. However, module 94 includes cable bundle slots 96 that are each configured to hold only one cable bundle 18.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A slack cable storage system comprising:

a base portion having a plurality of wall portions that are configured to form a cavity having an open front;

a cover portion configured to be attached to the base portion and configured to close the open front of the base portion;

a module portion configured to be removed from and replaced in the base portion;

wherein the module portion is configured to include a plurality of cable bundle receptacles;

wherein each of the cable bundle receptacles is configured to receive a portion of a cable bundle;

wherein the cable bundle receptacles are arranged in a row;

wherein each two adjacent ones of the cable bundle receptacles are separated by a separating wall portion;

wherein the module portion includes a removable retention portion that is configured to provide a barrier on one face of the module portion to restrict the cable bundle from exiting the cable bundle receptacles;

wherein the module portion is configured to support the cable bundle in one of the cable bundle receptacles so as to restrict the cable bundle from expanding and interfering with contents of the base portion;

wherein a first cable bundle receptacle of the cable bundle receptacles is configured to have an upper cable retention portion in an upper wall portion of the first cable bundle receptacle;

wherein the first cable bundle receptacle is configured to have a lower cable retention portion in a lower wall portion of the first cable bundle receptacle;

wherein the upper cable retention portion is configured to grip a first portion of a cable of a cable bundle in the first cable bundle receptacle; and wherein the lower cable retention portion is configured to grip a second portion of the cable of the cable bundle in the first cable bundle receptacle.

2. The slack cable storage system of claim 1, wherein the base portion is configured to receive a plurality of the module portions.

3. The slack cable storage system of claim 1, wherein the module portion is replaceably removable from the base portion.

4. The slack cable storage system of claim 1, wherein the upper cable retention portion is a slit in the upper wall portion.

5. The slack cable storage system of claim 1, wherein the lower cable retention portion is a slit in the lower wall portion.

6. The slack cable storage system of claim 1, wherein the cable bundle receptacle is a cable bundle slot.

7. The slack cable storage system of claim 1, wherein the cable bundle receptacle is a rectangular parallelepiped shape.

8. The slack cable storage system of claim 1, wherein the separating wall portion is configured to extend from a plane that includes rear edges of side walls of the module portion at an angle less than 90 degrees relative to the plane.

9. A cable storage container comprising:

a base portion having a cavity and a base opening portion;

a cover portion configured to be attached to the base portion so as to cover the base opening portion;

a module portion configured to be removed from and replaced in the base portion;

wherein the module portion has a plurality of cable bundle receptacles;

wherein each of the cable bundle receptacles is configured to receive a portion of a cable bundle;

wherein each two adjacent ones of the cable bundle receptacles are separated by a separating wall portion;

wherein the module portion is configured to support the cable bundle in one of the cable bundle receptacles so as to restrict the cable bundle from expanding and interfering with contents of the base portion;

wherein the module portion has a back wall portion; and wherein the separating wall portion is configured to extend from the back wall portion of the module portion at an angle less than 90 degrees relative to the back wall portion of the module portion.

10. The cable storage container of claim 9, wherein the cable bundle receptacles are arranged in a row.

11. The cable storage container of claim 9, wherein the module portion includes a removable retention portion that is configured to provide a barrier on one face of the module portion to restrict the cable bundle from exiting the cable bundle receptacles.

12. The cable storage container of claim 9, wherein the base portion is configured to receive a plurality of the module portion.

13. The cable storage container of claim 9, wherein the cable bundle receptacle is a rectangular parallelepiped shape.

14. The cable storage container of claim 9, wherein the separating wall portion is configured to extend from a plane that includes rear edges of side walls of the module portion at an angle less than 90 degrees relative to the plane.

\* \* \* \* \*